United States Patent
French et al.

(10) Patent No.: US 10,291,664 B2
(45) Date of Patent: May 14, 2019

(54) COLLABORATIVE PROJECT MODIFICATION

(71) Applicant: Brigham Young University, Provo, UT (US)

(72) Inventors: David French, Provo, UT (US); Ammon Hepworth, Provo, UT (US); Devin Shumway, Sandy, UT (US); Daniel Staves, Orem, UT (US); Mark S. Trent, Provo, UT (US)

(73) Assignee: Brigham Young University, Provo, UT (US)

( * ) Notice: Subject to any disclaimer, the term of this patent is extended or adjusted under 35 U.S.C. 154(b) by 216 days.

(21) Appl. No.: 14/726,116

(22) Filed: May 29, 2015

(65) Prior Publication Data

US 2015/0350273 A1 Dec. 3, 2015

Related U.S. Application Data

(60) Provisional application No. 62/005,704, filed on May 30, 2014.

(51) Int. Cl.
| | |
|---|---|
| *G06F 15/16* | (2006.01) |
| *H04L 29/06* | (2006.01) |
| *H04L 12/58* | (2006.01) |
| *H04L 12/18* | (2006.01) |

(52) U.S. Cl.
CPC ...... *H04L 65/4015* (2013.01); *H04L 12/1822* (2013.01); *H04L 51/36* (2013.01)

(58) Field of Classification Search
CPC .......................... H04L 65/403; H04L 12/1813
USPC .................................................. 709/204–205
See application file for complete search history.

(56) References Cited

U.S. PATENT DOCUMENTS

| | | | | |
|---|---|---|---|---|
| 5,787,175 | A * | 7/1998 | Carter | G06F 21/6209 707/999.008 |
| 7,933,952 | B2 * | 4/2011 | Parker | H04L 12/1813 709/204 |
| 8,527,327 | B1 | 9/2013 | Lawrence | |
| 8,584,122 | B2 * | 11/2013 | Ferrandiz | G06F 9/4843 718/101 |
| 2004/0090472 | A1 | 5/2004 | Risch et al. | |
| 2004/0267871 | A1 | 12/2004 | Pratley et al. | |
| 2005/0080502 | A1 | 4/2005 | Chernyak et al. | |
| 2005/0210008 | A1 * | 9/2005 | Tran | G06F 17/30864 |

(Continued)

OTHER PUBLICATIONS

PCT/US2015/033353, International Search Report and Written Opinion, dated Sep. 15, 2015.

*Primary Examiner* — Duyen M Doan
(74) *Attorney, Agent, or Firm* — Kunzler, PC

(57) ABSTRACT

An apparatus, method, and program product are disclosed for collaborative project modification. One apparatus includes an enabling module that enables a first group of users to modify a first portion of a project in a collaborative environment. The apparatus includes a blocking module that blocks a second portion of the project from being modified by the first group of users. The apparatus includes an updating module that, for the first group of users, conducts immediate updates to the first portion of the project after a user of the first group of users modifies the first portion of the project and conducts deferred updates to the second portion of the project after a user of a second group of users modifies the second portion of the project.

19 Claims, 10 Drawing Sheets

(56) References Cited

U.S. PATENT DOCUMENTS

| | | | |
|---|---|---|---|
| 2006/0136513 A1* | 6/2006 | Ngo | G06F 17/2288 |
| 2008/0209417 A1 | 8/2008 | Jakobson | |
| 2009/0006936 A1 | 1/2009 | Parker et al. | |
| 2009/0164521 A1* | 6/2009 | Lo | G06F 17/24 |
| 2009/0182763 A1* | 7/2009 | Hawking | G06F 17/30165 |
| 2013/0191451 A1* | 7/2013 | Tse | G06Q 10/101 |
| | | | 709/204 |
| 2014/0090084 A1* | 3/2014 | Goodinson | G06Q 10/101 |
| | | | 726/28 |
| 2014/0101637 A1 | 4/2014 | Clemm | |

* cited by examiner

COLLABORATIVE PROJECT MODIFICATION

CROSS REFERENCE TO RELATED APPLICATIONS

The present application is a Non-Provisional patent application of U.S. Provisional Application No. 62/005,704, filed on May 30, 2014, which is incorporated herein by reference in its entirety.

FIELD

The subject matter disclosed herein relates to collaborative projects, and more particularly relates to collaborative project modification.

BACKGROUND

Various projects may operate in a collaborative environment. For example, a project operating in a collaborative environment may include a document, a spreadsheet, a drawing, code, a simulation, a model, a presentation, a form, an animation, and an architecture. Many users may access and/or modify the project.

BRIEF SUMMARY

An apparatus for collaborative project modification is disclosed. A method and computer program product also perform the functions of the apparatus. In one embodiment, an apparatus includes an enabling module that enables a first group of users to modify a first portion of a project in a collaborative environment. The apparatus, in a further embodiment, includes a blocking module that blocks a second portion of the project from being modified by the first group of users. In another embodiment, the apparatus includes an updating module that, for the first group of users, conducts immediate updates to the first portion of the project after a user of the first group of users modifies the first portion of the project and conducts deferred updates to the second portion of the project after a user of a second group of users modifies the second portion of the project.

In some embodiments, the enabling module enables the second group of users to modify the second portion of the project in the collaboration environment and the blocking module blocks the first portion of the project from being modified by the second group of users. In one embodiment, the updating module, for the second group of users, conducts immediate updates to the second portion of the project after a user of the second group of users modifies the second portion of the project and conducts deferred updates to the first portion of the project after a user of the first group of users modifies the first portion of the project.

A method for collaborative project modification, in one embodiment, includes enabling a first group of users to modify a first portion of a project in a collaborative environment. The method includes, in one embodiment, blocking the first group of users from modifying a second portion of the project. In some embodiments, the method includes conducting immediate updates, for the first group of users, to the first portion of the project after a user of the first group of users modifies the first portion of the project. In certain embodiments, the method includes conducting deferred updates, for the first group of users, to the second portion of the project after a user of a second group of users modifies the second portion of the project.

In one embodiment, the method includes enabling the second group of users to modify the second portion of the project in the collaborative environment. In another embodiment, the method includes blocking the second group of users from modifying the first portion of the project. The method, in certain embodiments, includes conducting immediate updates, for the second group of users, to the second portion of the project after a user of the second group of users modifies the second portion of the project. In one embodiment, the method includes conducting deferred updates, for the second group of users, to the first portion of the project after a user of the first group of users modifies the first portion of the project.

In certain embodiments, the method includes splitting multiple users into the first and second groups of users. In other embodiments, the method includes merging the first and second groups of users. In certain embodiments, the method includes adjusting an update frequency for conducting the deferred updates. In such embodiments, the method may include that the update frequency is adjusted in response to changes in available computing resources and or that the update frequency is adjusted in response to changes in computing demands.

In some embodiments, the deferred updates are batched and selectively applied. In one embodiment, the project includes one or more of a document, a spreadsheet, a drawing, code, a simulation, a model, a presentation, a form, an animation, and an architecture. In certain embodiments, the project includes a computer-aided design ("CAD") model. In some embodiments, the project is stored on an information handling device of each user of the first and second groups of users and the project is updated on the information handling device of each user.

In one embodiment, the method includes enabling a user from the first group of users to leave the first group of users and join the second group of users. In another embodiment, the method includes blocking the first group of users from modifying a reference link between a first component of the first portion of the project and a second component of the second portion of the project. In certain embodiments, the method includes separating the project into the first portion and the second portion. In such embodiments, the method may include separating the project based on a hierarchical structure of the project and/or separating the project based on a three-dimensional ("3D") layout of the project. The method may, in some embodiments, include merging the first and second portions of the project.

Another method for collaborative project modification, in some embodiments, includes enabling each group of multiple groups to modify a respective portion of a project in a collaborative environment. In such embodiments, each group of the multiple groups may include multiple users. The method may include blocking each group of the multiple groups from modifying portions of the project that are not the group's respective portion. The method, in certain embodiments, includes conducting immediate updates to each group's respective portion of the project after modifications are made to the group's respective portion. In some embodiments, the method includes conducting deferred updates to portions of the project that are not the group's respective portion.

In one embodiment, a computer program product for collaborative project modification includes a computer readable storage medium having program instructions embodied therewith. The program instructions, in some embodiments, are executable by a processor to cause the processor to enable a first group of users to modify a first portion of a project in a collaborative environment. The program instructions, in one embodiment, are executable by a processor to cause the processor to block the first group of users from modifying a second portion of the project. The program instructions, in certain embodiments, are executable by a processor to cause the processor to conduct immediate updates, for the first group of users, to the first portion of the project after a user of the first group of users modifies the first portion of the project. The program instructions, in one embodiment, are executable by a processor to cause the processor to conduct deferred updates, for the first group of users, to the second portion of the project after a user of a second group of users modifies the second portion of the project.

The program instructions, in some embodiments, are executable by a processor to cause the processor to enable the second group of users to modify the second portion of the project in the collaborative environment. The program instructions, in one embodiment, are executable by a processor to cause the processor to block the second group of users from modifying the first portion of the project. The program instructions, in certain embodiments, are executable by a processor to cause the processor to conduct immediate updates, for the second group of users, to the second portion of the project after a user of the second group of users modifies the second portion of the project. The program instructions, in one embodiment, are executable by a processor to cause the processor to conduct deferred updates, for the second group of users, to the first portion of the project after a user of the first group of users modifies the first portion of the project. The program instructions, in certain embodiments, are executable by a processor to cause the processor to determine to separate the project into the first portion and the second portion.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
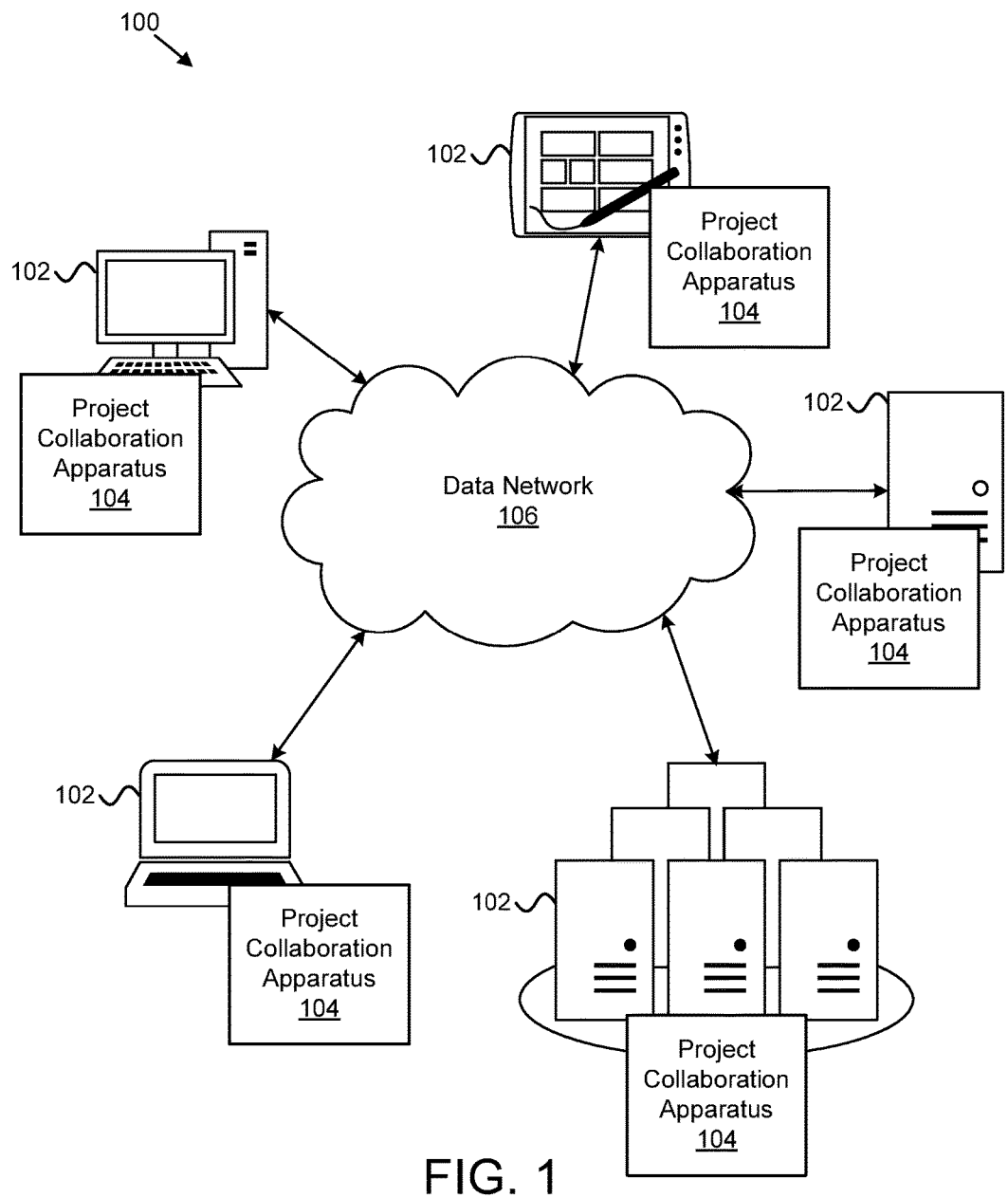
FIG. 1 is a schematic block diagram illustrating one embodiment of a system for collaborative project modification in accordance with one embodiment of the present invention.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures. Like numbers refer to like elements in all figures, including alternate embodiments of like elements.

FIG. 1 depicts one embodiment of a system 100 for collaborative project modification. In one embodiment, the system 100 includes information handling devices 102, project collaboration apparatuses 104, and networks 106. Even though a particular number of information handling devices 102, project collaboration apparatuses 104, and networks 106 are depicted in the system 100 of FIG. 1, one of skill in the art will recognize that any number or configuration of information handling devices 102, project collaboration apparatuses 104, and networks 106 may be present in the system 100.

The information handling devices 102, in certain embodiments, include computing devices, such as desktop computers, laptop computers, tablet computers, smart phones, smart televisions, smart watches, or the like. The information handling devices 102 may also include servers, such as web servers, application servers, file servers, media servers, email servers, cloud servers, backup servers, virtual servers, computer-aided design ("CAD") servers, or the like. In some embodiments, the information handling devices 102 may be part of a data center used for data storage, data backup, data replication, disaster recovery, and/or the like. The information handling devices 102 may be located in geographically remote locations, in the same geographic location (e.g., the same data center), or some combination of both.

The information handling devices 102 may be configured to store data, backup data, replicate data, or the like. For example, the information handling devices 102 may be configured to perform synchronous or asynchronous data replication. In another example, information handling devices 102 may be configured as failover devices for one or more associated production information handling devices 102. Moreover, the information handling devices 102 may comprise one or more storage volumes, storage devices, redundant array of independent disks ("RAID") devices or configurations, or the like, such as hard-disk drives, solid-state drives, flash memory devices, random-access memory ("RAM"), serial advanced technology attachment ("SATA") devices, tape devices, or the like. In some embodiments, the information handling devices 102 are in communication via one or more data networks 106, described below.

In one embodiment, the project collaboration apparatus 104 enables a first group of users to modify a first portion of a project in a collaborative environment. In certain embodiments, the project collaboration apparatus 104 blocks the first group of users from modifying a second portion of the project. In some embodiments, the project collaboration apparatus 104 conducts immediate updates, for the first group of users, to the first portion of the project after a user of the first group of users modifies the first portion of the project. In one embodiment, the project collaboration apparatus 104 conducts deferred updates, for the first group of users, to the second portion of the project after a user of a second group of users modifies the second portion of the project. In this manner, the project collaboration apparatus 104 may allow a large number of users to collaboratively participate in modifying the project. For example, by limiting immediate project updates to the portion of the project that a specific group is working on, separate groups may work on separate portions without overburdening the resources of an individual information handling device 102. In certain embodiments, as described below with reference to FIGS. 2 and 3, the project collaboration apparatus 104 includes multiple modules that perform the operations of the project collaboration apparatus 104.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN"), an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, random access memory ("RAM"), or the like.

Figure 2:
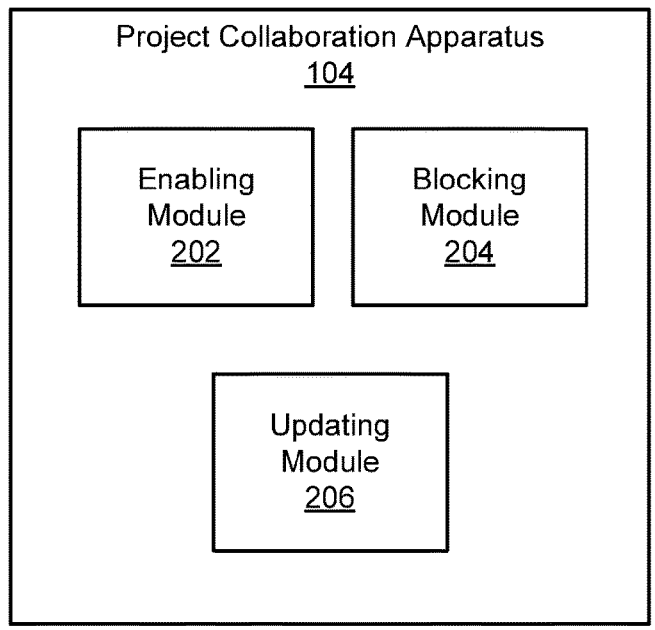
FIG. 2 is a schematic block diagram illustrating one embodiment of a module for collaborative project modification in accordance with one embodiment of the present invention.

FIG. 2 is a schematic block diagram illustrating one embodiment of a module 200 for collaborative project modification. In one embodiment, the module 200 includes an embodiment of a project collaboration apparatus 104. The project collaboration apparatus 104, in various embodiments, includes one or more of an enabling module 202, a blocking module 204, and an updating module 206, which are described in more detail below.

In one embodiment, the enabling module 202 enables a first group of users to modify a first portion of a project in a collaborative environment. In some embodiments, the enabling module 202 enables a second group of users to modify a second portion of the project in the collaborative environment. Furthermore, in certain embodiments, the enabling module 202 enables each group of multiple groups to modify a respective portion of a project in a collaborative environment. In some embodiments, each group includes multiple users, while in other embodiments, one or more groups may include only one user. As may be appreciated, all portions of the project may collectively make up the entire project. For example, in one embodiment, the first and second portions of the project collectively make up the entire project. Using the enabling module 202, groups of users may be enabled to modify an assigned portion of the project. Accordingly, to work on their assigned portion of the project, a group of users may only receive immediate updates to their assigned portion of the project.

The project may be any suitable project, such as a project including one or more of a document, a spreadsheet, a drawing, code, a simulation, a model, a presentation, a form, an animation, and an architecture, for example. In some embodiments, the project may include a computer-aided design ("CAD") model. Moreover, modifying a portion of the project may include editing the portion, adding to the portion, changing the portion, deleting from the portion, and so forth.

The blocking module 204, in some embodiments, blocks a second portion of the project from being modified by the first group of users. Moreover, in one embodiment, the blocking module 204 blocks the first portion of the project from being modified by the second group of users. In certain embodiments, the blocking module 204 blocks each group of multiple groups from modifying portions of the project that are not the group's respective portion. Using the blocking module 204, groups of users may be blocked from modifying all unassigned portions of the project. Accordingly, a group of users may only need to receive immediate updates to their assigned portion of the project because the group of users does not participate in modifying unassigned portions of the project. As may be appreciated, assigned portions of the project may be portions of the project that the group of users is a part of.

In certain embodiments, even though the blocking module 204 blocks portions of the project from being modified by certain groups of users, the portions of the project that are blocked from being modified may be viewed, such as via a read-only setting. In some embodiments, all users may access the entire project for viewing purposes, and users may access only an assigned portion of the project for modifying. In addition to blocking portions of the project from being modified, those same portions of the project may not be updated immediately. It should be noted that by blocking portions of the project from being modified, the number of updates to such portions may be limited thereby not adding to the workload of other users information handling devices 102.

In some embodiments, the blocking module 204 may block all users from modifying certain features of the project. For example, in one embodiment, the blocking module 204 may block a first group of users and/or a second group of users from modifying a reference link between a first component of the first portion of the project and a second component of a second portion of the project, as described in greater detail in relation to FIG. 7.

The updating module 206, in certain embodiments and for the first group of users, conducts immediate updates to the first portion of the project after a user of the first group of users modifies the first portion of the project and conducts deferred updates to the second portion of the project after a user of a second group of users modifies the second portion of the project. Moreover, in some embodiments and for the second group of users, the updating module 206 conducts immediate updates to the second portion of the project after a user of the second group of users modifies the second portion of the project and conducts deferred updates to the first portion of the project after a user of the first group of users modifies the first portion of the project. In one embodiment, the updating module 206 conducts immediate updates to each group's respective portion of the project after modifications are made to the group's respective portion and conducts deferred updates to portions of the project that are not the group's respective portion.

Immediate updates may be conducted immediately (i.e., without intended hesitation) and may occur in real-time from the perspective of the user. As may be appreciated, immediate updates may also be considered real-time updates, near real-time updates, substantially real-time updates, dynamic updates, and so forth. For example, immediate updates may be provided automatically within seconds or minutes of a modification to the project being made. Moreover, immediate updates may operate in a collaborative environment such that when modifications to the project are made and/or saved, the modifications are provided to other concurrent users of the project so that all versions of the project have the latest modifications. For example, certain embodiments may store the project locally on an information handling device 102 of each user (e.g., thin-server, thick-client environments). Accordingly, immediate updates may include providing updates to the project stored on each information handling device 102. In some embodiments, the immediate updates are provided only for a portion of the project.

Furthermore, deferred updates may also be considered selective updates, non-real time updates, delayed updates, and so forth. For example, deferred updates may be provided at a scheduled time, when computer resources are sufficient, when a project is no longer separated into portions, upon selection, on-demand, and so forth. Moreover, deferred updates may operate in a collaborative environment such that when modifications are made and/or saved, the modifications are not immediately provided to the users, but are stored to be provided to users of the project at a later time, such as in batches and/or being selectively applied.

In certain embodiments, the updating module 206 may provide immediate updates to all groups of users for all portions of the project; however, the updates provided to users for respective unassigned portions of the project may be lightweight representations. As may be appreciated, lightweight representations may be any representation of a portion of the project that uses a lower amount of data than a non-lightweight representation (e.g., standard or normal representation). In one embodiment, lightweight representations may be faster for an information handling device 102 to load and/or may include simpler features (e.g., simpler geometry). In some embodiments, lightweight representations may not include all details of the portion of the project. It should be noted that other discussions of the project and/or portions of the project in this disclosure may not specifically state that they refer to non-lightweight representations; however, by default the discussions of the project and/or portions of the project in this disclosure generally concern non-lightweight representations unless otherwise stated. Furthermore, while this disclosure generally relates to non-lightweight representations, certain implementations of the disclosed embodiments may be applicable to lightweight representations and/or a combination of lightweight and non-lightweight representations.

In some embodiments, the updating module 206 may provide immediate updates to the portion of the project to which a user is assigned and may provide deferred updates to all other portions of the project. In such embodiments, the deferred updates may include lightweight representations of applicable portions of the project. Furthermore, the deferred updates may be provided to users on-demand and/or at a predetermined time interval, such as every 5 minutes, 10 minutes, 60 minutes, and so forth. As may be appreciated, updating the project using lightweight representations may enable updates to be provided to users, yet may reduce the resources used by the information handling devices 102 of the users as compared to updating the project using only non-lightweight representations. Upon merging portions of the project that include lightweight and non-lightweight representations, the lightweight representations may be replaced by non-lightweight representations.

In some embodiments, the project collaboration apparatus 104 may alert users that a project is split into portions and/or alert users about what users are part of a synchronous collaborative group. For example, a graphical user interface ("GUI") or some other tool may be used to indicate such information to users. Furthermore, data that is loaded in a user's view, but is currently read-only (e.g., "frozen" because it belongs to another group) may be marked using a different color, smaller weight, text effect, and so forth, so that a user may clearly see that they cannot work on that portion of the project. Furthermore, in some embodiments, the project collaboration apparatus 104 may include a tool to enable a user to leave their collaboration group and join another collaboration group. In certain embodiments, the project collaboration apparatus 104 may include a tool to manage and/or modify the partition of groups.

In some embodiments, at least a portion of the enabling module 202, the blocking module 204, and the updating module 206 includes one or more of hardware and executable code. In such embodiments, the executable code may be stored on one or more computer readable storage media.

Figure 3:
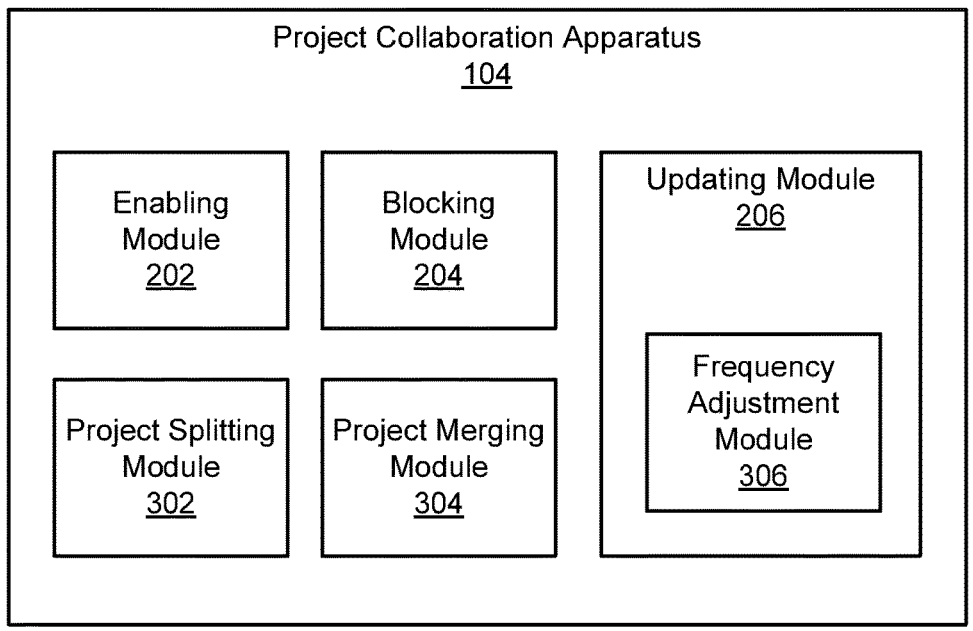
FIG. 3 is a schematic block diagram illustrating one embodiment of another module for collaborative project modification in accordance with one embodiment of the present invention.

FIG. 3 is a schematic block diagram illustrating one embodiment of another module 300 for collaborative project modification. In one embodiment, the module 300 includes an embodiment of a project collaboration apparatus 104. The project collaboration apparatus 104, in various embodiments, includes one or more of an enabling module 202, a blocking module 204, and an updating module 206, which may be substantially similar to the enabling module 202, the blocking module 204, and the updating module 206 described above. The project collaboration apparatus 104 may also include one or more of a project splitting module 302, a project merging module 304, and a frequency adjustment module 306, which are described in more detail below.

In one embodiment, the project splitting module 302 separates the project into two or more portions, such as by separating the project into a first portion and a second portion. The project splitting module 302 may separate the project into portions using any suitable technique. For example, the project splitting module 302 may separate the project into portions based on a hierarchical structure of the project, based on a three-dimensional ("3D") layout of the project, based on a memory usage of each portion, based on a processor usage of each portion, based on computer resources used by each portion, based on a number of users allocated to each portion, and so forth. Certain techniques for separating the project into portions are described in greater detail in relation to FIGS. 8 and 9.

In some embodiments, the project splitting module 302 may split up multiple users into separate groups of users, such as one group of users for each portion of the project. As may be appreciated, a user may be assigned to one group initially; however, during operation, a user may selectively leave one group and join another group. For example, a user from a first group of users may be enabled to leave the first group of users and join a second group of users.

In certain embodiments, a user may be part of two or more groups and may receive immediate updates for all groups to which the user belongs. In such embodiments, the number of groups to which the user belongs may depend on the ability of the information handling device 102 of the user to handle the immediate updates from the groups. In some embodiments, the project collaboration apparatus 104 may facilitate determining the ability of the information handling device 102 to handle the immediate updates from the groups. In embodiments in which the user is part of two or more groups, the user may be able to modify the portions of the project that correspond to the two or more groups; however, the user may be blocked from modifying certain referential aspects in which a component of one portion references a component of another portion.

In some embodiments, the project splitting module 302 may facilitate forming group by users selecting portions of the project to which they would like to receive updates. In such embodiments, certain portions of the project may be assigned to multiple groups or to no group at all. For example, a first user A may select to receive immediate updates for a first component CA and a second component CB; a second user B may select to receive immediate updates for the second component CB and a fourth component CD; a third user C may select to receive immediate updates for a third component CC and the fourth component CD; and a fourth user D may select to receive immediate updates for the first component CA, the third component CC, and the fourth component CD. As such, there may be any number of groups and each group may receive immediate updates for any number of portions of the project. As may be appreciated, the portions of the project to which a user receives immediate updates may be limited by the ability of the information handling device 102 of the user. In such embodiments, users may be blocked from modifying certain referential aspects in which a component of one portion references a component of another portion. Because of the overlap between the groups, there may be a large number of referential aspects that are blocked from being modified.

The project merging module 304, in certain embodiments, merges (e.g., combines, recombines) the portions of the project, such as combining the first and second portions of the project. Furthermore, the project merging module 304, in some embodiments, merges groups of users together, such as by combining a first and second group of users into a single group of users collaboratively working on the project.

The frequency adjustment module 306 may be part of the updating module 206. In one embodiment, the frequency adjustment module 306 adjust an update frequency for conducting deferred updates. For example, the frequency adjustment module 306 may adjust deferred updates from a frequency of zero (e.g., when the project is not split into portions there are no deferred updates) to a higher frequency (e.g., when the project is split into portions). In some embodiments, deferred updates may occur when a user selects the deferred updates to occur, automatically without human intervention, or some combination of user selected updates and automatic updates.

In certain embodiments, the frequency of deferred updates is adjusted in response to changes in available computing resources and/or changes in computing demands. In one example, computing resources may be sufficient to conduct immediate updates to the complete project for all users, and therefore, the frequency of deferred updates is zero. In another example, computing resources may be insufficient to conduct immediate updates to the complete project for all users. Accordingly, the project may be split into separate portions such that there are sufficient computing resources to conduct immediate updates to the individual portions. Deferred updates may then be used to update the entire project, and therefore, the frequency of deferred updates is greater than zero. In some embodiments, deferred updates may be performed at predetermined intervals, at any point in time that computing resources are sufficient, at a scheduled time, as desired by a user, and so forth.

Figure 4:
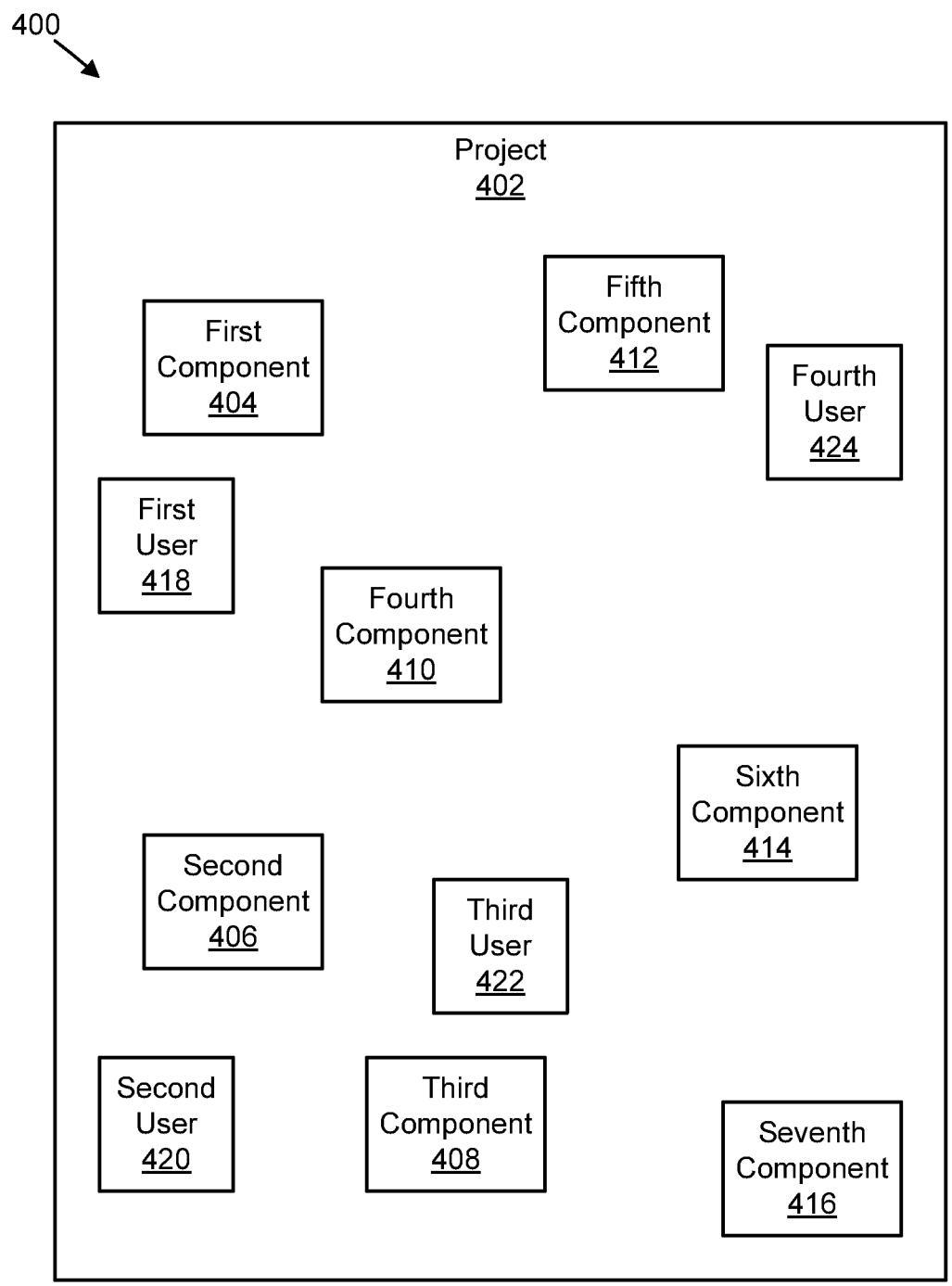
FIG. 4 is a schematic block diagram illustrating one embodiment of a collaborative project having multiple users in accordance with one embodiment of the present invention.

FIG. 4 is a schematic block diagram illustrating one embodiment of a collaborative project 400 having multiple users. As illustrated, the collaborative project 400 includes a project 402 having a first component 404, a second component 406, a third component 408, a fourth component 410, a fifth component 412, a sixth component 414, and a seventh component 416. Each of the components 404-416 may be any type of subdivision of the project 402. For example, in one embodiment, the components 404-416 may be one or more of a component, a feature, an object, a subdivision, and so forth.

As may be appreciated, any suitable number of users may use the project 402. In the illustrated embodiment, a first user 418, a second user 420, a third user 422, and a fourth user 424 use the project 402. The users 418-424 operate in a synchronous collaborative manner on the project 402, such that a local copy of the project 402 for each of the users 418-424 that is stored on an information handling device 102 for the user is updated with immediate updates. Each of the users 418-424 may add, modify, and/or delete components within the project 402. Accordingly, after any of the users 418-424 modifies the project 402, the modification gets passed to the other users 418-424 for the information handling devices 102 of the other users 418-424 to process so that all versions of the project 402 include all modifications (e.g., are up-to-date). It should be noted that even though the components 404-416 as illustrated in FIGS. 4 through 6 do not show any change, such components may be continuously modified, new components may be added, and certain components may be deleted.

Figure 5:
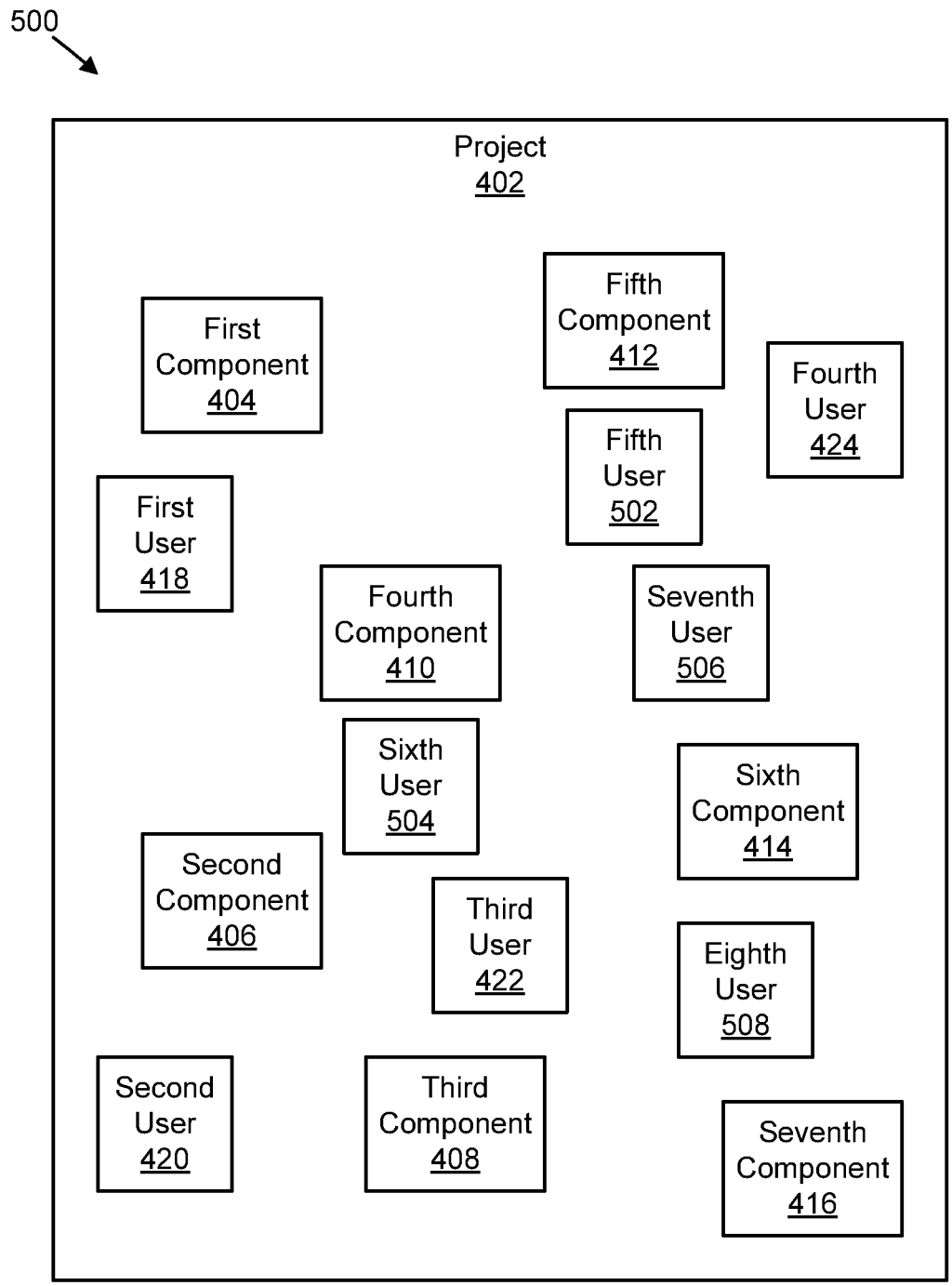
FIG. 5 is a schematic block diagram illustrating one embodiment of a collaborative project having the project of FIG. 4 and having additional users in accordance with one embodiment of the present invention.

FIG. 5 is a schematic block diagram illustrating one embodiment of a collaborative project 500 having the project 402 of FIG. 4 and having additional users. Indeed, the project 402 includes a fifth user 502, a sixth user 504, a seventh user 506, and an eighth user 508. Each of the users 418-424 and 502-508 may actively contribute to the project 402 by adding, modifying and/or deleting components within the project 402. In certain embodiments, one or more information handling devices 102 of the users 418-424 and 502-508 may have insufficient resources (e.g., processing power) to process all of the modification updates to the project 402 from the contributions made by the other users 418-424 and 502-508. Accordingly, the project 402 stored on the information handling devices 102 of the users 418-424 and 502-508 may become out-of-date (e.g., not current) and/or a user interface thread may be blocked as the information handling devices 102 process updates from the other users 418-424 and 502-508.

Figure 6:
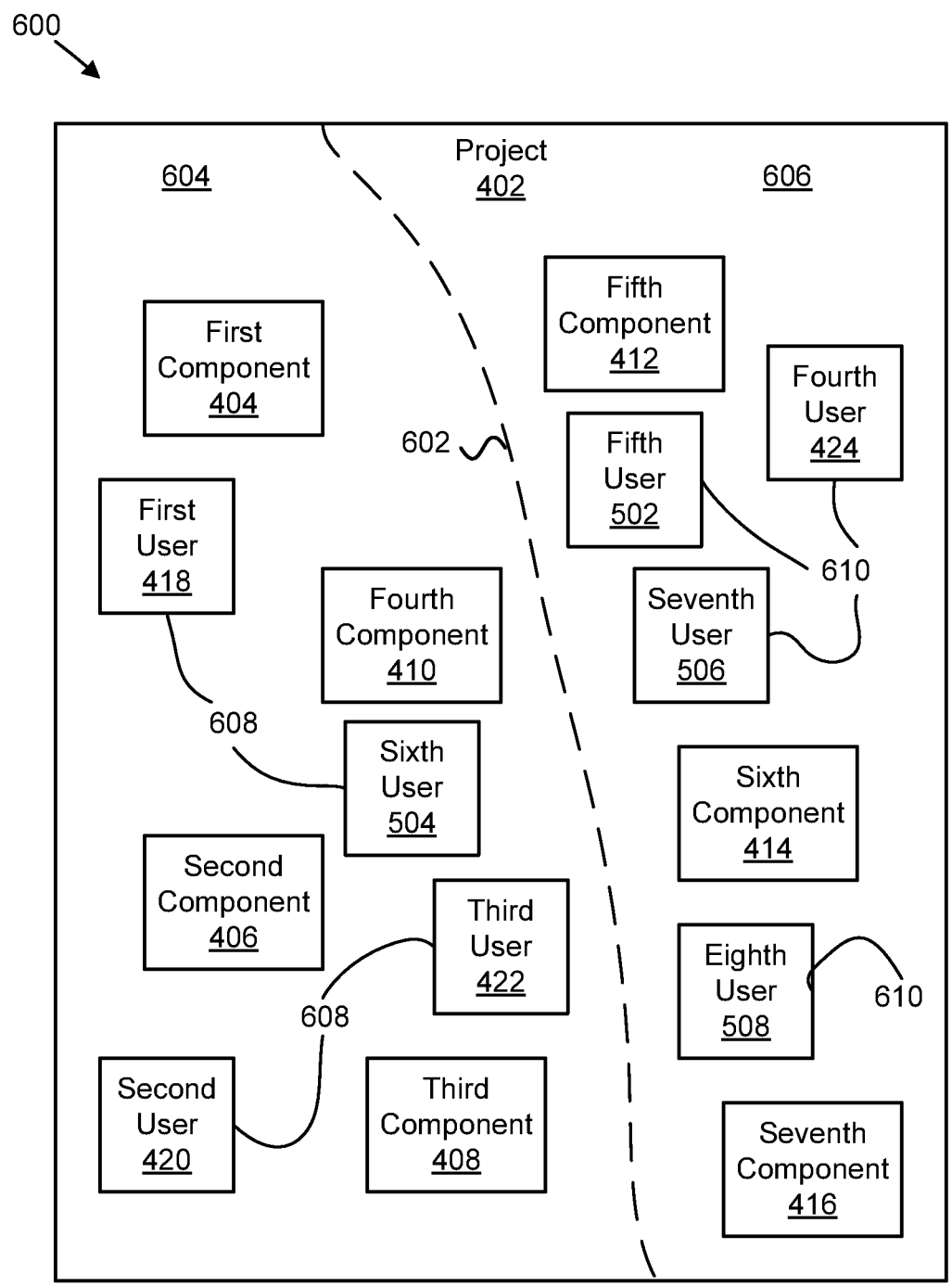
FIG. 6 is a schematic block diagram illustrating one embodiment of a collaborative project having the project of FIG. 5 divided into portions in accordance with one embodiment of the present invention.

FIG. 6 is a schematic block diagram illustrating one embodiment of a collaborative project 600 having the project 402 of FIG. 5 divided into portions. Specifically, a dashed line 602 divides the project 402 into a first portion 604 and a second portion 606. In some embodiments, one of the users 418-424 and 502-508 may determine that the project 402 should be broken into two or more portions (e.g., the first portion 604 and the second portion 606). In other embodiments, the project collaboration apparatus 104 may automatically determine that one or more of the information handling devices 102 have insufficient resources to one or more of update the project 402 and facilitate modifying the project 402 for each of the users 418-424 and 502-508, and may therefore divide the project 402 into two or more portions (e.g., the first portion 604 and the second portion 606). By dividing the project 402 into two or more portions, the collaborative user group may be broken up into two separate synchronous collaborative groups. For example, the users 418-424 and 502-508 may be split from being one collective collaborative user group to being a first synchronous collaborative group 608 and a second synchronous collaborative group 610.

The first synchronous collaborative group 608 may include the first user 418, the second user 420, the third user 422, and the sixth user 504, and the second synchronous collaborative group 610 may include the fourth user 424, the fifth user 502, the seventh user 506, and the eighth user 508. In certain embodiments, the first synchronous collaborative group 608 may be enabled to modify the first portion 604 of the project 402, and may be enabled to only view the second portion 606 of the project 402. Furthermore, the first synchronous collaborative group 608 may receive immediate updates from other users within the first synchronous collaborative group 608. Accordingly, the first portion 604 of the project 402 may be up-to-date for the first synchronous collaborative group 608. In contrast, the first synchronous collaborative group 608 may not be able to edit the second portion 606 of the project 402 (e.g., the second portion 606 may be read-only for the first synchronous collaborative group 608). In addition, the second portion 606 of the project 402 may only receive deferred updates such that the second portion 606 of the project 402 is only updated for the first synchronous collaborative group 608 at certain time periods (e.g., not in real-time).

Moreover, the second synchronous collaborative group 610 may be enabled to modify the second portion 606 of the project 402, and may be enabled to only view the first portion 604 of the project 402. Furthermore, the second synchronous collaborative group 610 may receive immediate updates from other users within the second synchronous collaborative group 610. Accordingly, the second portion 606 of the project 402 may be up-to-date for the second synchronous collaborative group 610. In contrast, the second synchronous collaborative group 610 may not be able to edit the first portion 604 of the project 402 (e.g., the first portion 604 may be read-only for the second synchronous collaborative group 610). In addition, the first portion 604 of the project 402 may only receive deferred updates such that the first portion 604 of the project 402 is only updated for the second synchronous collaborative group 610 at certain time periods (e.g., not in real-time).

The first and second synchronous collaborative groups 608 and 610 may work simultaneously for a period of time, ignorant of the modifications that the other group is making. In certain embodiments, while both the first and second synchronous collaborative groups 608 and 610 are working, one user of the first synchronous collaborative group 608 may decide they want to see the latest state of the second portion 606 of the project. To see the latest state of the second portion 606 of the project, the user of the first synchronous collaborative group 608 may manually select to update the second portion 606 of the project and/or the user of the first synchronous collaborative group 608 may leave the first synchronous collaborative group 608 and join the second synchronous collaborative group 610. As may be appreciated, if a user leaves the first synchronous collaborative group 608 and joins the second synchronous collaborative group 610, such a user only receives immediate updates associated with the second synchronous collaborative group 610 and no longer receives immediate updates associated with the first synchronous collaborative group 608. After being in the second synchronous collaborative group 610 for a period of time, the user may leave the second synchronous collaborative group 610 and rejoin the first synchronous collaborative group 608.

In some embodiments, one or more of the users 418-424 and 502-508 may begin to contribute less actively, leave the model, and/or determine to merge the project 402 (e.g., via a work break or a convenient time). In either of these situations, and in one embodiment, one of the users 418-424 and 502-508 may manually trigger a merge of the first and second portions 604 and 606 and/or the first and second synchronous collaborative groups 608 and 610. In another embodiment, the project collaboration apparatus 104 may detect that there is less activity in the project 402 and therefore the project 402 may merge automatically. When the first and second portions 604 and 606 of the project 402 are merged, the project 402 returns to being one unified synchronous collaborative project 402 in which modifications from each of the users 418-424 and 502-508 are updated to the other users 418-424 and 502-508 in real-time. The information handling devices 102 of the users 418-424 and 502-508 may be able to process the immediate updates for the entire project 402 because of the decrease in activity level of the users 418-424 and 502-508. As may be appreciated, any remaining users 418-424 and 502-508 of the merged project 402 may manually fix any merge conflicts and/or errors.

In certain embodiments, a large number of users (e.g., up to hundreds, or more) may access the project 402 for the purpose of only viewing the project 402 (e.g., read-only). In such an embodiment, certain users 418-424 and 502-508 may contribute to the project 402 by making modifications. Accordingly, the project 402 may remain combined because a majority of the users are not making modifications to the project 402.

Figure 7:
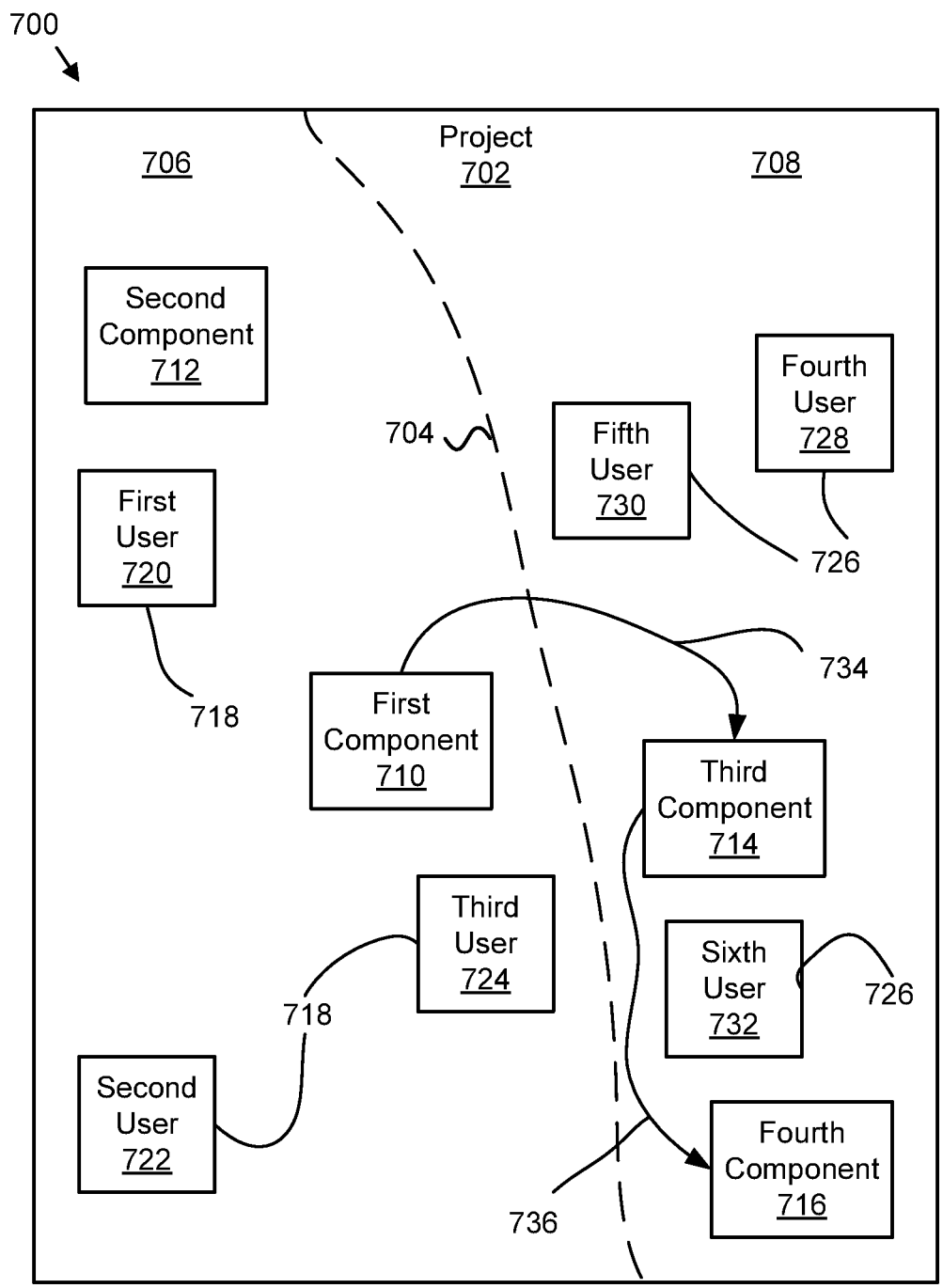
FIG. 7 is a schematic block diagram illustrating one embodiment of a collaborative project having reference links in accordance with one embodiment of the present invention.

FIG. 7 is a schematic block diagram illustrating one embodiment of a collaborative project 700 having reference links. The collaborative project 700 includes a project 702 split by a dashed line 704 into a first portion 706 and a second portion 708. The first portion 706 of the project 702 includes a first component 710 and a second component 712. Moreover, the second portion 708 of the project 702 includes a third component 714 and a fourth component 716.

A first synchronous collaborative group 718 includes a first user 720, a second user 722, and a third user 724. The first synchronous collaborative group 718 is organized (e.g., assigned) to modify the first portion 706 of the project 702. Furthermore, a second synchronous collaborative group 726 includes a fourth user 728, a fifth user 730, and a sixth user 732. The second synchronous collaborative group 726 is organized (e.g., assigned) to modify the second portion 708 of the project 702.

As may be appreciated, references may exist in a project any time that one component references (e.g., relies on) another component. In some projects, references may include a parameter and/or expression that references another parameter and/or expression, a constraint that references a geometry and/or an assembly component, an assembly component that references a part model, a geometry that references another geometry, a cell that references another cell, a table of contents that references a document page, and so forth.

In certain embodiments, a reference may exist in which one component in a first portion of a project references another component in a second portion of the project. For example, as illustrated, the first component 710 which is part of the first portion 706 of the project 702 references the third component 714 which is part of the second portion 708 of the project 702. The reference between the first component 710 and the third component 714 is illustrated via a first reference link 734. If the first reference link 734 is modified, users of the first and/or second synchronous collaborative groups 718 and 726 may not know that the reference is invalid, changed, deleted, and/or broken because they are not synchronously collaborative with each other.

In certain embodiment, the first synchronous collaborative group 718 may be enabled to delete and/or modify the reference link 734 because the first component 710 is referencing (e.g., not referenced by) the third component 714. Furthermore, in some embodiments, the first synchronous collaborative group 718 may be blocked from creating a new reference link between a component of the first portion 706 that is referenced by a component of the second portion 708. Moreover, in one embodiment, the first synchronous collaborative group 718 may be blocked from modifying the reference link 734 to change the reference link 734 from referencing the third component 714 to referencing another component in the second portion 708 of the project 702.

In some embodiments, there may be certain ways to manage a component in one portion of a project that is reference by (e.g., not referencing) a component in another portion of the project (e.g., the third component 714 in the second portion 708 of the project 702 that is referenced by the first component 710 in the first portion 706 of the project 702). For example, users of the second synchronous collaborative group 726 (or a subset of the users of the second synchronous collaborative group 726—such as users with elevated privileges) may be enabled to modify and/or delete the third component 714. In such an embodiment, the users of the second synchronous collaborative group 726 may see an effect that breaking the reference link 734 has on the first portion 706 of the project 702 because the users of the second synchronous collaborative group 726 have a version of the first portion 706 (e.g., potentially outdated) of the project 702. However, in this example, users of the first synchronous collaborative group 718 may not see that the reference link 734 is broken and/or changed until the first and second portions 706 and 708 are merged together. This embodiment may provide users of the second synchronous collaborative group 726 with flexibility, but may limit the ability of the first synchronous collaborative group 718 to see potential broken and/or changed links.

In another embodiment, the third component 714 may be frozen (e.g., read-only) so that no one can modify and/or delete the third component 714. This would ensure that if the first component 710 continues to depend on the third component 714, the reference link 734 will not be broken. However, in such an embodiment, the second synchronous collaborative group 726 may have limited flexibility for modifying components within the second portion 708 of the project 702. In projects 702 with many reference links, this could have a significant impact on modifications made to individual portions of the project.

In yet another embodiment, the first and second synchronous collaborative groups 718 and 726 may modify and/or delete any reference link, reference component, and/or referenced component. When such a modification is made, an alert may be provided in real-time to all groups affected by the modification. Such an alert may be made without significantly using resources of the information handling devices 102 of the users.

Another reference exists between the third component 714 and the fourth component 716 as illustrated via the second reference link 736; however, the third and fourth components 714 and 716 are both part of the second portion 708 of the project 702. Accordingly, the second reference link 736 may be modified by the second synchronous collaborative group 726 without affecting the first portion 706. Furthermore, if the second reference link 736 is modified, the users within the second synchronous collaborative group 726 may be notified in real-time via updates, and may therefore work collaboratively to fix the reference.

Figure 8:
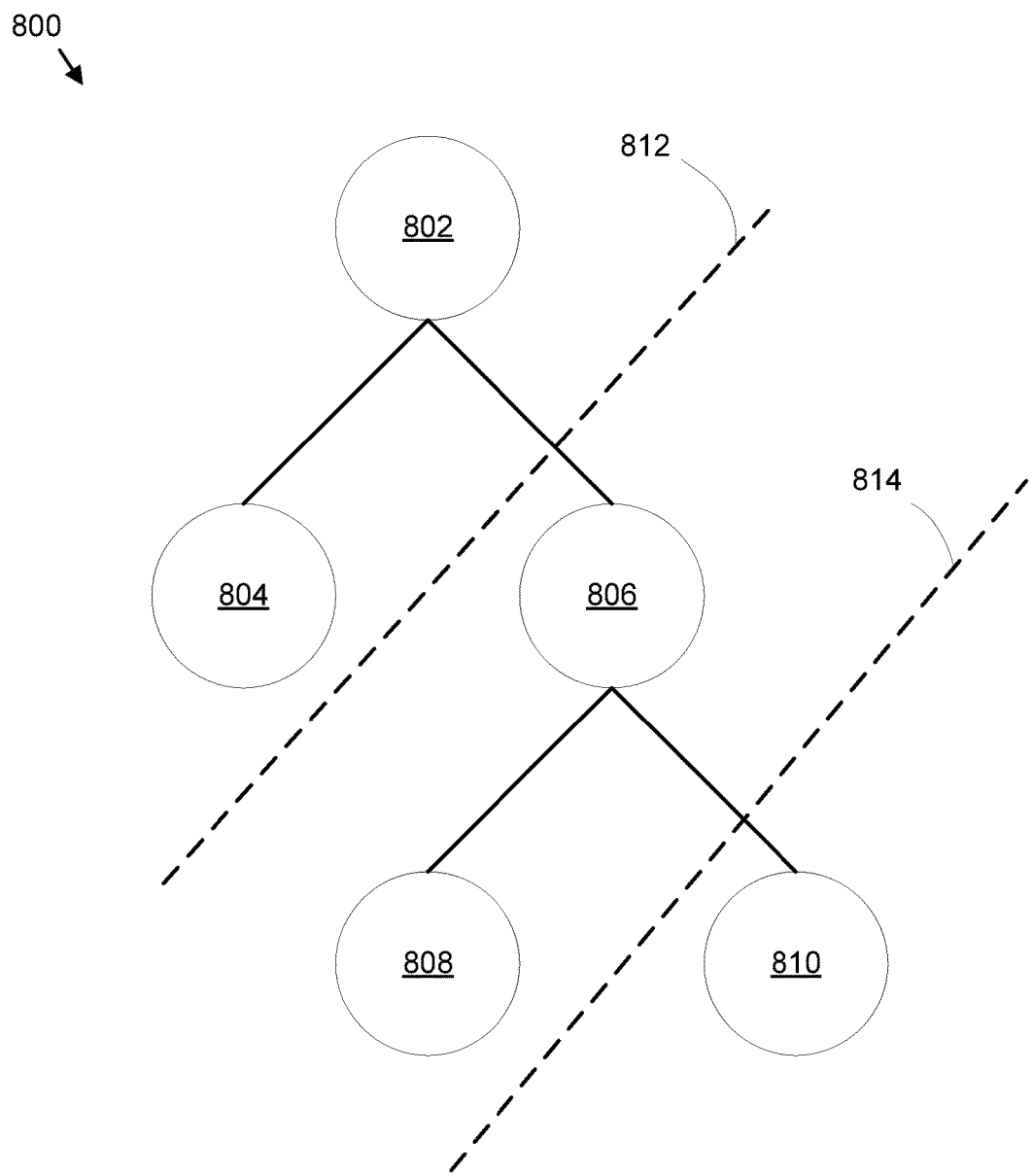
FIG. 8 is a schematic block diagram illustrating one embodiment of a hierarchy of a collaborative project in accordance with one embodiment of the present invention.

FIG. 8 is a schematic block diagram illustrating one embodiment of a hierarchy of a collaborative project 800. The collaborative project 800 includes a first subproject 802 that is the highest hierarchical level. The first subproject 802 includes a second subproject 804 and a third subproject 806. Moreover, the third subproject 806 includes a fourth subproject 808 and a fifth subproject 810. When enough users use the collaborative project 800 so that the collaborative project 800 is to be split so that the information handling devices 102 of the users have sufficient resources to handle respective updates, the collaborative project 800 may be split based on its hierarchical relationships.

For example, the collaborative project 800 may be split along a first dashed line 812 and a second dashed line 814. Thus, the collaborative project 800 may be split into a first portion including the first subproject 802 and the second subproject 804, a second portion including the third subproject 806 and the fourth subproject 808, and a third portion including the fifth subproject 810. Thus, the collaborative project 800 is split based on the hierarchical relationships. At an appropriate time, the first, second, and third portions of the collaborative project 800 may be merged together again.

Figure 9:
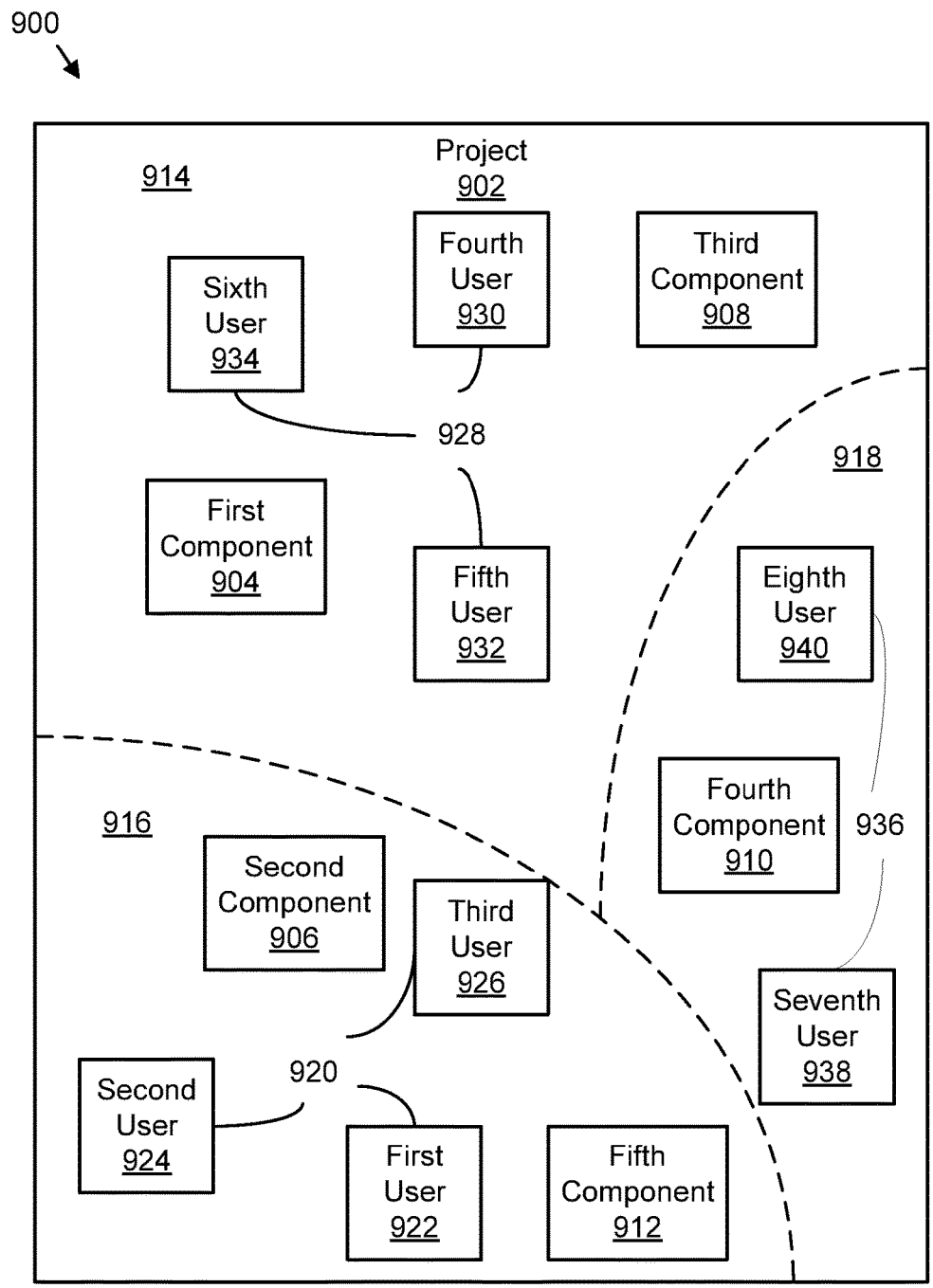
FIG. 9 is a schematic block diagram illustrating one embodiment of spatial divisions of a collaborative project in accordance with one embodiment of the present invention.

FIG. 9 is a schematic block diagram illustrating one embodiment of spatial divisions of a collaborative project 900. The collaborative project 900 includes a project 902 having a first component 904, a second component 906, a third component 908, a fourth component 910, and a fifth component 912. The project 902 is split into multiple synchronous collaborative groups and corresponding portions using spatial partitions that separate the project 902 into different spatial regions that may later be merged together.

A first portion 914 includes the first component 904 and the third component 908, a second portion 916 includes the second component 906 and the fifth component 912, and a third portion 918 includes the fourth component 910. Moreover, a first synchronous collaborative group 920 includes a first user 922, a second user 924, and a third user 926. The first synchronous collaborative group 920 corresponds to the second portion 916. A second synchronous collaborative group 928 includes a fourth user 930, a fifth user 932, and a sixth user 934. The second synchronous collaborative group 928 corresponds to the first portion 914. Furthermore, a third synchronous collaborative group 936 includes a seventh user 938 and an eighth user 940. The third synchronous collaborative group 936 corresponds to the third portion 918.

As may be appreciated, each of the first, second, and third synchronous collaborative groups 920, 928, and 936 may work in a synchronous collaborative manner within their respective second, first, and third portions 916, 914, and 918, as described above. At an appropriate time, two or more of the first, second, and third portions 914, 916, and 918 may be merged together. It should be noted that in certain embodiments a project may be split using a combination of hierarchical and spatial separation techniques.

Figure 10:
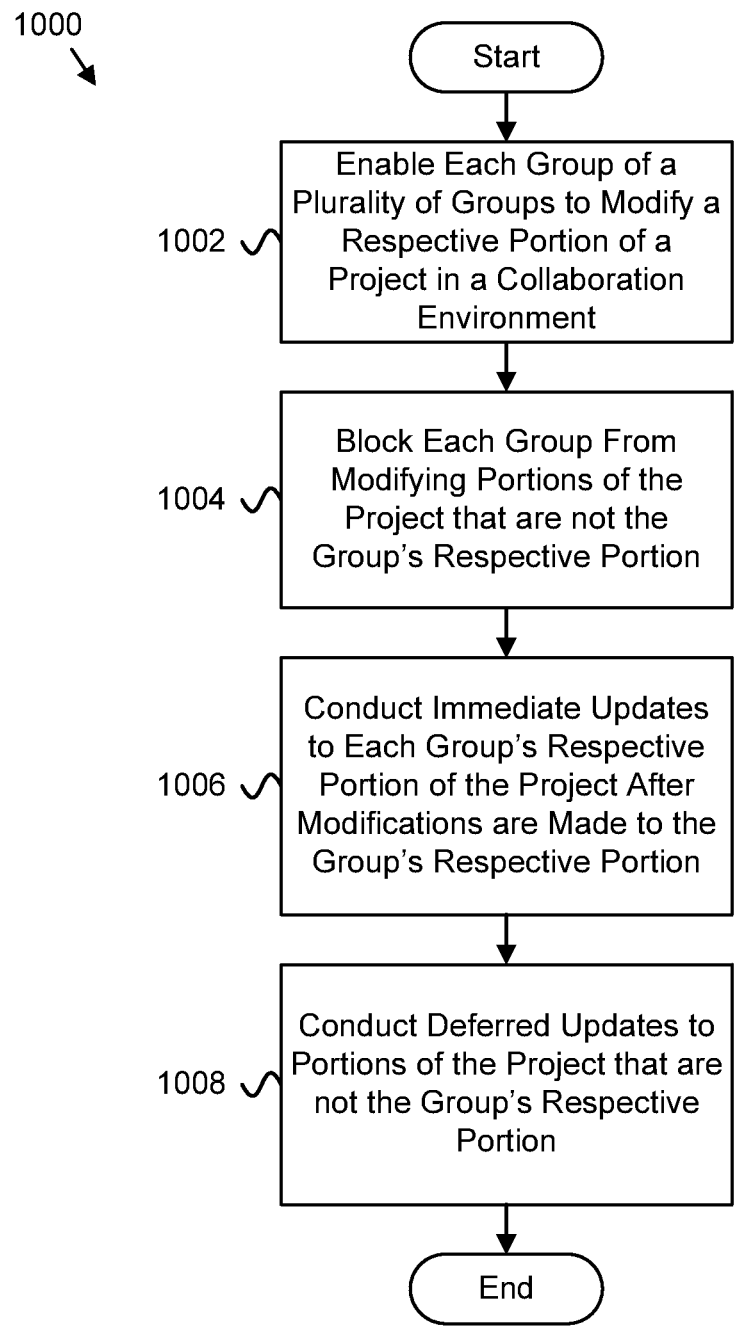
FIG. 10 is a schematic flow chart diagram illustrating one embodiment of a method for collaborative project modification in accordance with one embodiment of the present invention.

FIG. 10 is a schematic flow chart diagram illustrating one embodiment of a method 1000 for collaborative project modification. The method 1000 begins and the project collaboration apparatus 104 enables 1002 each group of multiple groups to modify a respective portion of a project in a collaborative environment. In certain embodiments, each group of the multiple groups may include multiple users. In some embodiments, the enabling module 202 enables 1002 each group of multiple groups to modify the respective portion of the project in the collaborative environment.

The project collaboration apparatus 104 blocks 1004 each group of the multiple groups from modifying portions of the project that are not the group's respective portion. In some embodiments, the blocking module 204 blocks 1004 each group of the multiple groups from modifying portions of the project that are not the group's respective portion. In some embodiments, the project collaboration apparatus 104 conducts 1006 immediate updates to each group's respective portion of the project after modifications are made to the group's respective portion. In certain embodiments, the updating module 206 conducts 1006 the immediate updates to each group's respective portion of the project after modifications are made to the group's respective portion. The project collaboration apparatus 104 conducts 1008 deferred updates to portions of the project that are not the group's respective portion. In certain embodiments, the updating module 206 conducts 1008 deferred updates to portions of the project that are not the group's respective portion, and the method 1000 ends.

Figure 11:
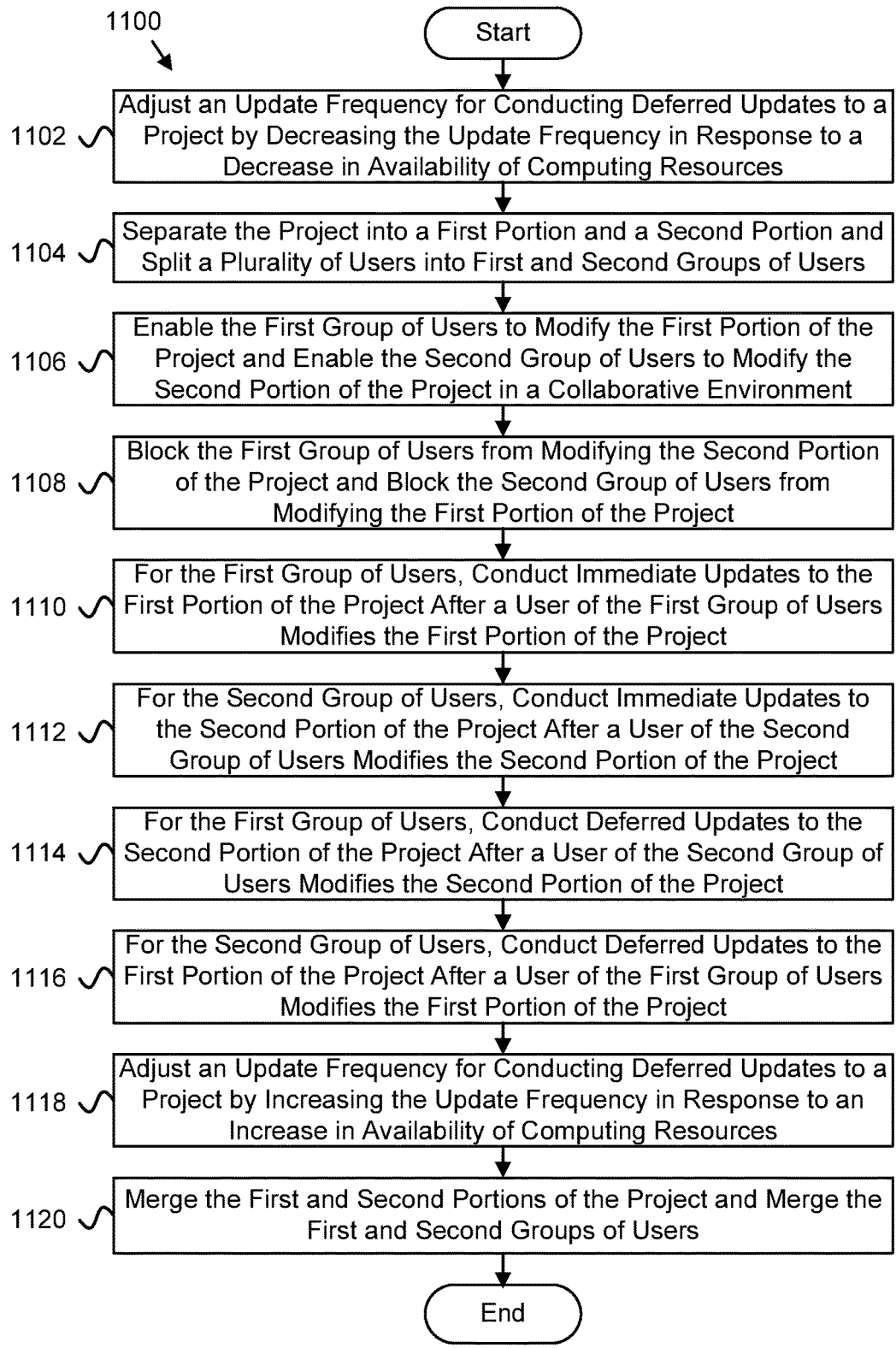
FIG. 11 is a schematic flow chart diagram illustrating one embodiment of another method for collaborative project modification in accordance with one embodiment of the present invention.

FIG. 11 is a schematic flow chart diagram illustrating one embodiment of another method 1100 for collaborative project modification. The method 1100 begins and the project collaboration apparatus 104 adjusts 1102 an update frequency for conducting deferred updates to a project by decreasing the update frequency in response to a decrease in availability of computing resources and/or an increase in computing demands. In some embodiments, the frequency adjustment module 306 adjusts 1102 the update frequency for conducting deferred updates to the project by decreasing the update frequency in response to the decrease in availability of computing resources and/or the increase in computing demands. Moreover, the project collaboration apparatus 104 separates 1104 the project into a first portion and a second portion and/or splits multiple users into first and second groups of users. In some embodiments, the project splitting module 302 separates 1104 the project into the first portion and the second portion and/or splits multiple users into the first and second groups of users. In certain embodiments, the project is separated into the first and second portion based on a hierarchical structure of the project and/or based on a three-dimensional ("3D") layout of the project.

The project collaboration apparatus 104 enables 1106 the first group of users to modify the first portion of the project and enables the second group of users to modify the second portion of the project, both in a collaborative environment. In some embodiments, the enabling module 202 enables 1106 the first group of users to modify the first portion of the project and enables the second group of users to modify the second portion of the project. In certain embodiments, the enabling module 202 may enable a user from the first group of users to leave the first group of users and join the second group of users.

The project collaboration apparatus 104 blocks 1108 the first group of users from modifying the second portion of the project and blocks the second group of users from modifying the first portion of the project. In some embodiments, the blocking module 204 blocks 1108 the first group of users from modifying the second portion of the project and blocks the second group of users from modifying the first portion of the project. In certain embodiments, the blocking module 204 may block the first group of users from modifying a reference link between a first component of the first portion of the project and a second component of the second portion of the project.

In certain embodiments, the project collaboration apparatus 104, for the first group of users, conducts 1110 immediate updates to the first portion of the project after a user of the first group of users modifies the first portion of the project. In one embodiment, the updating module 206 conducts 1110 immediate updates to the first portion of the project after a user of the first group of users modifies the first portion of the project. In some embodiments, the project collaboration apparatus 104, for the second group of users, conducts 1112 immediate updates to the second portion of the project after a user of the second group of users modifies the second portion of the project. In certain embodiments, the updating module 206 conducts 1112 immediate updates to the second portion of the project after a user of the second group of users modifies the second portion of the project.

In certain embodiments, the project collaboration apparatus 104, for the first group of users, conducts 1114 deferred updates to the second portion of the project after a user of the second group of users modifies the second portion of the project. In one embodiment, the updating module 206 conducts 1114 deferred updates to the second portion of the project after a user of the second group of users modifies the second portion of the project. In some embodiments, the project collaboration apparatus 104, for the second group of users, conducts 1116 deferred updates to the first portion of the project after a user of the first group of users modifies the first portion of the project. In certain embodiments, the updating module 206 conducts 1116 deferred updates to the first portion of the project after a user of the first group of users modifies the first portion of the project. In some embodiments, the updating module 206 may conduct 1114 the deferred updates to the second portion and/or conduct 1116 the deferred updates to the first portion such that the deferred updates are batched and selectively applied.

The project collaboration apparatus 104 adjusts 1118 an update frequency for conducting deferred updates to a project by increasing the update frequency in response to an increase in availability of computing resources and/or a decrease in computing demands. In some embodiments, the frequency adjustment module 306 adjusts 1118 the update frequency for conducting deferred updates to the project by increasing the update frequency in response to the increase in availability of computing resources and/or the decrease in computing demands. Moreover, the project collaboration apparatus 104 merges 1120 the first and second portions of the project and/or merges the first and second groups of users, and the method 1100 ends. In some embodiments, the project merging module 304 merges 1120 the first and second portions of the project and/or merges the first and second groups of users.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   one or more non-transitory computer readable storage media;
   a project splitting module that partitions a project in a collaborative environment into a first portion and a second portion and an original group of users into a first group of users and a second group of users in response to an increase in computing resources used to modify the project;
   an enabling module that enables each user of the first group of users to modify the first portion of the project and enables each user of the second group of users to modify the second portion of the project;
   a blocking module that blocks all users that are not members of the first group of users from modifying the first portion of the project and blocks all users that are not members of the second group of users from modifying the second portion of the project;
   an updating module that provides an immediate update to each user of the first group of users and a delayed update to each user of the second group of users in response to a first user of the first group of users modifying the first portion of the project, wherein the updating module provides an immediate update to each user of the second group of users and a delayed update to each user of the first group of users in response to a second user of the second group of users modifying the second portion of the project, and
   wherein at least a portion of the enabling module, the blocking module, and the updating module comprise one or more of hardware and executable code, the executable code being stored on the one or more non-transitory computer readable storage media.

2. A method comprising:
   splitting a project in a collaborative environment into a first portion and a second portion and splitting an original group of users into a first group of users and a second groups of users in response to an increase in computing resources used to modify the project by the original group of users;
   enabling each user of the first group of users to modify the first portion of the project;
   enabling each user of the second group of users to modify the second portion of the project;
   blocking all users that are not members of the first group of users from modifying the first portion of the project;
   blocking all users that are not members of the second group of users from modifying the second portion of the project;
   providing an immediate update to each user of the first group of users and a delayed update to all users that are not members of the first group of users in response to a first user of the first group of users modifying the first portion of the project and thereby reduce usage of computer resources used to modify the project; and
   providing an immediate update to each user of the second group of users and a delayed update to all users that are not members of the second group of users in response to a second user of the second group of users modifying the second portion of the project and thereby reduce usage of computer resources used to modify the project.

3. The method of claim 2, further comprising merging the first group of users and the second groups of users into a merged group of users in response to a decrease in computing resources used to modify the project.

4. The method of claim 2, comprising batching a plurality of deferred updates to provide batched updates and providing the batched updates at a selected update frequency.

5. The method of claim 4, wherein the selected update frequency is adjusted in response to a change in computing resources used by the first and second group of users to modify the project.

6. The method of claim 4, wherein the selected update frequency is adjusted in response to changes in computing demands.

7. The method of claim 2, wherein the project comprises one or more of a document, a spreadsheet, a drawing, code, a simulation, a model, a presentation, a form, an animation, and an architecture.

8. The method of claim 2, wherein the project comprises a computer-aided design ("CAD") model.

9. The method of claim 2, wherein the project is stored on an information handling device of each user of the first and second groups of users and the project is updated on the information handling device of each user.

10. The method of claim 2, comprising enabling a user from the first group of users to leave the first group of users and join the second group of users.

11. The method of claim 2, comprising blocking the first group of users from modifying a reference link between a first component of the first portion of the project and a second component of the second portion of the project.

12. The method of claim 2, comprising separating the project into the first portion and the second portion.

13. The method of claim 12, wherein separating the project into the first portion and the second portion comprises separating the project based on a hierarchical structure of the project.

14. The method of claim 12, wherein separating the project into the first portion and the second portion comprises separating the project based on a three-dimensional ("3D") layout of the project.

15. The method of claim 2, comprising merging the first and second portions of the project.

16. A method comprising:
splitting a project in a collaborative environment into plurality of portions and splitting an original group of users into a plurality of groups in response to an increase in computing resources used to modify the project by the original group of users, wherein each group of the plurality of groups comprises a plurality of users;
enabling each group of the plurality of groups to modify a respective portion of the project in the collaborative environment;
blocking each group of the plurality of groups from modifying portions of the project that are not the group's respective portion;
providing immediate updates to each group's respective portion of the project after modifications are made to the group's respective portion; and
providing batched updates to portions of the project that are not the group's respective portion to reduce usage of computer resources for the plurality of groups.

17. A computer program product for project collaboration, the computer program product comprising a non-transitory computer readable storage medium having program instructions embodied therewith, the program instructions executable by a processor to cause the processor to:
split a project in a collaborative environment into a first portion and a second portion and splitting an original group of users into a first group of users and a second groups of users in response to an increase in computing resources used to modify the project by the original group of users;
enable each user of the first group of users to modify the first portion of the project;
enable each user of the second group of users to modify the second portion of the project;
block all users that are not members of the first group of users from modifying the first portion of the project;
block all users that are not members of the second group of users from modifying the second portion of the project;
provide an immediate update to each user of the first group of users and a delayed update to each user of the second group of users in response to a first user of the first group of users modifying the first portion of the project; and
provide an immediate update to each user of the second group of users and a delayed update to each user of the first group of users in response to a second user of the second group of users modifying the second portion of the project and thereby reduce usage of computer resources by the first group of users.

18. The computer program product of claim 17, wherein the program instructions executable by the processor further cause the processor to determine to separate the project into the first portion and the second portion.

19. The apparatus of claim 1, further comprising a project merging module configured to merge the first group of users and the second groups of users into a merged group of users in response to a decrease in computing resources used to modify the project.

* * * * *